March 20, 1956

S. C. GIUFFRÉ

2,738,922

CENTRIFUGAL SEPARATOR

Filed July 18, 1952

INVENTOR.
Salvatore Carlo Giuffré

BY
Wenderoth, Lind + Ponack

Attorneys

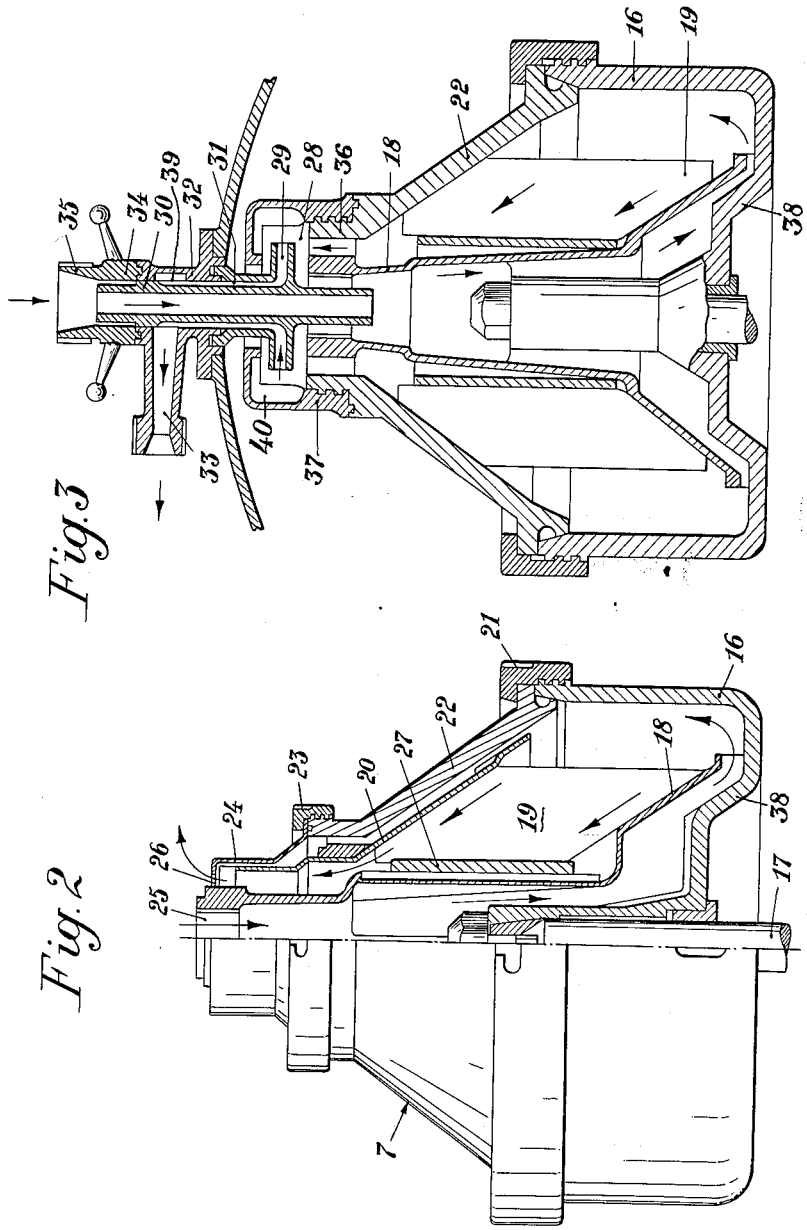

United States Patent Office 2,738,922
Patented Mar. 20, 1956

2,738,922

CENTRIFUGAL SEPARATOR

Salvatore Carlo Giuffré, Messina, Italy

Application July 18, 1952, Serial No. 299,721

Claims priority, application Italy July 25, 1951

4 Claims. (Cl. 233—21)

The present invention relates to a method of purification by centrifugation, particularly for juices of citrus fruits. Another object of this invention is the apparatus whereby said method is carried out.

The purpose of this invention is to obtain, from the treatment of a product of an extraction cycle from citrus fruits, of a substantially known type, a turbid, but purified liquid, i. e. a liquid wherefrom the rougher cells have been removed together with the heterogeneous particles which are necessarily present in the liquid obtained from the simple extraction, in order to obtain a better juice, suitable to be used for the further stages of treatment.

It is known that the juice obtained by the extraction phase, effected by means of the apparatus presently known, also contains, besides the liquid part which is to be obtained, all the soil and other impurities such as moulds, parasites and the like, present on the external surface of the pericarp of the fruit, as well as the stone fragments and the mucilages, the cartilagenous residues, and the like.

A purifying treatment is therefore necessary for said juices, treatment for which different methods have been used up to now, and particularly filtering or decantation methods. By the filtering method liquid juices are obtained which are therefore free of the finer cells, the presence of which, in the purified juices, renders the latter of a better quality; consequently the liquid obtained by filtering must be submitted to further phases of treatment for adding to the liquid juice the said prized cells, which have to be separated and removed from the filtering residue, by means of long and costly subsidiary operations, which require considerable time and working.

Furthermore, the filtering method requires long and frequent stoppages for cleaning the filtering members which are obstructed by the aforecited waste materials.

The second method by which liquid juices are also obtained, is natural decantation which requires, however, the employment of large premises, a very high number of containers, formed in general by wood barrels, a remarkable employment of costly working and a lengthy treating duration which, moreover, also results in a prolonged exposition of the juices to the oxidizing and emulsifying action of the air.

The decantation occurs in repeated phases, by pouring the juices from a container to another, and requires continuous cleaning operations of the employed barrels.

The regular development of the treatment is furthermore often obstructed by undesired muddying of the product.

The purpose of this invention is that of obviating all the aforecited inconveniences, by providing a treatment out of contact with the atmosphere, for the raw juices obtained in apparatus of a known type, said juices being rapidly purified and clarified, so that while the rough cells, the soil, the mucilages, the cartilagenous fragments and stone fragments, the parasites, the moulds and the like, are removed, the juices, although purified and clarified, remain rich in prized cells.

A further purpose of the method according to the invention is that of rapid production of great quantities of prized quality juice.

It is important to note that the method according to the invention does not effect the separation of the juices from the cells, as it occurs by the decantation method, or by the filtering method, but it does effect the centrifugal purification and clarification out of contact with the atmosphere, and therefore out of the emulsifying and oxidizing action of the air, so that the raw juices of citrus fruits, although being carried to the state of prized product, i. e. deprived of all the impurities, maintain their finer cells, with all their physical, chemical and organoleptic properties.

As it will be seen hereinafter, the apparatus which carry out the method according to the invention have small dimensions and can be placed in very limited premises, and result in considerable economy in the working and labor expenses.

The juice already purified by the method according to the invention, lastly, can be further clarified by means either of a filter press or of centrifugal clarifying devices, whenever it is desired to obtain a juice totally deprived of cells.

According to the invention, the juice coming from an extraction cycle carried out by means of apparatus of a substantially known type, must be submitted to centrifugation in an apparatus wherein the liquid is not stratified, but only caused to rotate by means of a blade member, forcing then the liquid to come out from the centrifuge in a zone as close as possible to the axis of rotation of the liquid mass.

In order to obtain the aforecited purposes, the device carrying out said method comprises substantially means suitable to effect the centrifugation of the liquid, without causing stratification thereof, said means being formed by a centrifuge containing a blade member, in combination with a clarifying device.

This invention will be better understood from the following specification relating to some preferred embodiments of the centrifuge for carrying out the method according to the invention.

In the drawings:

Fig. 1 diagrammatically shows a complete plant for the extraction and purification of the juices;

Fig. 2 shows an elevational detail, partially in section of the purifying device only, with the external casing removed;

Fig. 3 is a sectional view taken along the axis of rotation, of a different embodiment of the purifying device with the external casing of the apparatus removed.

With reference to the drawings, the complete plant, which is described hereinafter only for better explaining the insertion of the purifying phase according to the invention of the cycle of treatment of the juices, comprises an extraction machine 1, of a substantially known type. The raw juices produced in the machine 1 fall in the basin 2, wherefrom, by means of the pump 3, they are carried along the tube 4 to a collecting basin 5.

From this latter, by means of the tube 6, controlled by a sluice valve or by a cock 8, the raw juices to be purified fall in the centrifugal purifying device, designated as a whole by 7, which is the device wherein the method according to the invention is carried out, and some preferred embodiments of which will be described more particularly hereinafter.

The juice, purified in the apparatus 7, is then carried by means of the tube 10 towards a concentrator 13, possibly through a pasteurization apparatus 12 or a filter press 14, which can be inserted in, or excluded from, the cycle by means of the sluice valves diagrammatically shown at 15 and 41.

This way juices can also be obtained which are so purified and clarified as to be completely liquid and brilliant. Or, the filter press 14 can be used as a safety element when, by disattention or carelessness of the person working at the purifying device 7, there might be a passage towards the concentrator 13 of portions of imperfectly purified juice.

Fig. 2 shows one embodiment of the purifying device, designated as a whole by 7, adapted to carry out the method according to the invention, with its external casing, shown by 11 in Fig. 1, removed.

The device 7 is a centrifuge comprising a bowl 16, the lower part of which is cylindrical; said bowl is supported and rotated by the shaft 17, operated by any external prime mover and has a central portion 38 projecting inwardly with a frusto-conical profile.

Axially with respect to said bowl there is placed the distributor 18 which is formed with a hollow inlet column substantially cylindrical in its upper part and having a substantial frusto-conical lower part which faces the central portion 38 of the bowl to form a passage for the juice to be purified. On the distributor 18 there is fixed a blade member having a plurality of blades 19, arranged according to a star in planes having as common axis the axis of the assembly.

The blades are contained between the external surface of the lower portion of the distributor 18 and a dividing cone 20 placed over the blades, the presence of which is however not indispensable for the operation of the unit.

Towards the axis of the machine, the blades 19 are supported by a cylinder 27, coaxial with the column of the distributor, and the height of which is such as to allow the passage of the liquid toward the clarifying ring which will be described hereinafter, between its upper edge and the internal surface of the dividing cone or, in absence of this latter, the internal surface of the bowl cover.

On the upper edge of the bowl 16 is fixed, by means of the threaded ring 21, the cover 22, on the upper portion which is fixed, by means of another threaded ring 23, the clarifying ring or disc 24.

Both the aforecited dividing cone, and the cover 22 have a substantially frusto-conical shape.

The clarifying ring 24 leaves an annular space 26 for the discharge of the purified juice which has been brought upwards by the blades 19.

As aforesaid, the bowl is rotated by the shaft 17; the raw juices are either discharged from the collecting basin 5 (Fig. 1) or supplied by gravity, or by means of a pump within the upper opening 25 of the column of the distributor 18. The juices fall internally along said column, following the path shown by the arrows, are rotated by said distributor, and, passing through the blade member and the internal surface of the bowl, by centrifugal force, are purified, leaving the soil, the mucilages, the rough cells and in general all the impurities, adherent to the cylindrical internal wall of the bowl 16, while the purified liquid rises between the blades of the member 19 and continues the selection of the rough cells, which remain in the bowl, from the fine cells remaining in the liquid; said liquid passes through the clarifying ring 24 and comes out from the annular space 26, to be further sent to the final phases of successive treatments (pasteurization, concentration, etc.).

Summarizing, the characteristic of the device is therefore that of comprising in a centrifuge, the means suitable to rotate the mass of the liquid to be treated (rotation which is necessary for obtaining the removal of the heavier parts for the purification), and to cause its rising towards the upper portion of the device, without causing the stratification of the liquid, in combination with a clarifying element.

In this embodiment, the exit of the liquid occurs without the liquid being submitted to pressure, and there is therefore a free discharge.

In a different embodiment of this device it is, on the contrary, possible to obtain the discharge under pressure of the purified juice.

In Fig. 3 showing this second embodiment the same reference numbers are used for the points which are common with the embodiment of Fig. 2.

The second embodiment is not provided with the dividing cone, since as already stated, it is not indispensable.

Also in this case, in the bowl 16 of the purifier, the parts causing the separation of the prized finer cells contained in the juice from the heterogeneous parts (impurities) and from the rougher cells, are formed by the blade member 19 and by the clarifying disc 36 which in this case is integral with the cover 22 of the bowl.

In addition to the portion of the device with free discharge, previously described, there is, in this case, a device allowing the exit under pressure of the purified liquid. This device comprises a collecting chamber 40 formed in a cap 37 fixed to a cover 22, e. g. it is screwed thereto.

In said chamber there are provided blades 28 which maintain the juice in rotation.

In said chamber there is inserted a suction device formed by a star of blades 29 shaped as an impeller of a centrifugal pump; the blades are mounted on a tube 30, which is externally provided with grooves 31, through which the purified juice is extracted.

The blades 29 and the tube 30 are inserted in the supporting part 32, wherein a collecting recess 39 for the juice is formed which recess is provided with a tube 33 for the exit of the juice, said part being fixed by the nut 34 provided with clamping members, and forming, by means of its upper portion 35, the joint for the tube supplying to the purifying device the juice to be purified.

In this connection it is noted that the tube 30 is inserted in the distributor 18 of the purifying device.

The path of the juice inside the device, as shown by the arrows, is as follows: The juice enters through the joint 35, falls inside the tube 30 and enters the bowl 16, being rotated by the distributor 18. The juice is carried by this latter into the larger zone of the purifying device, wherein the heavier parts are separated and remain adherent to the cylindrical internal surface of the bowl 16, while the remainder rises, coming closer to the center and continues the selection of the fine cells from the rough ones, as in the embodiment of Fig. 2.

The juice enters, passing through the clarifying disc 36, into the chamber 40, wherefrom the sucking device formed by the blades 29 takes said juice and sends it, along the grooves of the tube 30, for causing its exit under pressure, through the tube 33, by means of which the juice is carried into the apparatus wherein the successive phases of the treatment of the juice occur. Also in this case the raw juice is supplied to the joint 35 either by gravity or by means of a pump.

According to a variation not shown in the figures, the cover 22 of the bowl is movable and hydraulically controlled from outside, so that by lifting it, the solid parts, which accumulate in the bowl, may be automatically evacuated.

If said variation is not adopted, both in the free discharge purifier and in that under pressure, it is necessary to periodically stop the machine in order to manually effect the operation of removal of the solid residues.

The purification of juices according to the method aforedescribed and with devices which carry it out, can be effected also when the juices have already been concentrated before their purification.

I claim:

1. Apparatus for centrifugally purifying fruit juices, particularly citrus fruit juices, comprising a rotating bowl provided with a cover, the bottom of the said bowl having a central portion projecting inwardly with a frusto-conical profile, a distributor located inside the bowl coaxial therewith and stationary with respect thereto, said distributor being formed with a hollow inlet column substantially cylindrical in its upper part and substantially frusto-conical in its lower part, the said lower frusto-conical part facing the said frusto-conical central projecting portion of the bottom of the bowl to form a passage for the juice to be purified, the inner surface of the said distributor being adapted to convey the juice to be purified inside the bowl and to throw it against the side walls of the bowl, and the outer surface of the said distributor being adapted to convey toward the outlet of the bowl the liquid which has been rotated and purified, a blade member mounted on the said distributor and fixed thereto, said blade member being adapted to convey the purified juice, in cooperation with the outer surface of the said distributor, toward the outlet of the bowl, a clarifying ring applied to the upper part of the cover of the bowl and coaxial with the cylindrical portion of the said distributor, said clarifying ring being arranged to generate in cooperation with the said cylindrical portion of the said distributor an annulus for the discharge from the bowl of the purified juice which has been brought upwards by the said blade member.

2. Apparatus for centrifugally purifying fruit juices, particularly citrus fruit juices, comprising a substantially cylindrical rotating bowl provided with a substantially frusto-conical cover, the bottom of the said bowl having a central portion projecting inwardly with a frusto-conical profile, a distributor located inside the bowl coaxial therewith and stationary with respect thereto, said distributor being formed with a hollow inlet column substantially cylindrical in its upper part and substantially frusto-conical in its lower part, the said lower frusto-conical part facing the said frusto-conical central projecting portion of the bottom of the bowl to form a passage for the juice to be purified, the inner surface of the said distributor being adapted to convey the juice to be purified inside the bowl and to throw it against the side walls of the bowl, and the outer surface of the said distributor being adapted to convey toward the outlet of the bowl the liquid which has been rotated and purified, a dividing cone placed over the said distributor and stationary therewith, a blade member mounted on the said distributor and fixed thereto, said blade member having blades abutting downward against the outer conical surface of the said distributor and upwards against the inner surface of the said dividing cone, said blade member being adapted to convey the purified juice, in cooperation with the outer surface of the said distributor, toward the outlet of the bowl, a clarifying ring applied to the upper part of the cover of the bowl and coaxial with the cylindrical part of the said distributor, said clarifying ring being arranged to generate in cooperation with the said cylindrical part of the said distributor an annulus for the discharge from the bowl of the purified juice which has been brought upwards by the said blade member.

3. Apparatus for centrifugally purifying fruit juices, particularly citrus fruit juices, comprising a substantially cylindrical rotating bowl provided with a substantially frusto-conical cover, the bottom of the bowl having a central portion projecting inwardly with a frusto-conical profile, a distributor located inside the bowl coaxial therewith and stationary with respect thereto, said distributor being formed with a hollow inlet column substantially cylindrical in its upper part and substantially frusto-conical in its lower part, the said lower frusto-conical part facing the said frusto-conical central projecting portion of the bottom of the bowl to form a passage for the juice to be purified, the inner surface of the said distributor being adapted to convey the juice to be purified inside the bowl and to throw it against the side walls of the bowl, and the outer surface of the said distributor being adapted to convey toward the outlet of the bowl the liquid which has been rotated and purified, a blade member mounted on the said distributor and fixed thereto, said blade member having blades abutting downwards against the outer conical surface of the said distributor and facing at their upper edge the inner surface of the cover of the bowl, said blade member being adapted to convey the purified liquid, in cooperation with the outer surface of the said distributor, toward the outlet of the bowl, a clarifying ring formed by the upper part of the cover of the bowl, said clarifying ring being arranged to generate in cooperation with the said cylindrical part of the distributor an annulus for the discharge from the bowl of the purified juice which has been brought upward by the blade member, a chamber applied to the upper part of the cover of the bowl, said chamber being provided with blades arranged to keep in rotation the purified juice coming out of the bowl through the said clarifying ring, a suction device in said chamber adapted to vertically raise under pressure the juice coming from the said chamber, a discharge pipe adapted to collect the juice sucked by the said suction device and to remove the juice from the purifying apparatus in a direction substantially perpendicular to the inlet direction of the juice to be purified in the said purifying apparatus.

4. Apparatus as claimed in claim 3, wherein said suction device comprises a plurality of blades located around a tube and shaped as the blades of an impeller of a centrifugal pump, said tube being provided with longitudinal grooves on its outer surface, along which grooves the juice conveyed by the said plurality of blades last mentioned rises, said tube extending in its lower part inside the upper part of the said distributor to admit into the latter the juice to be purified, the outer longitudinal grooves of the said tube running into a collecting recess conveying the purified juice in the said discharge pipe.

References Cited in the file of this patent

UNITED STATES PATENTS

| | | |
|---|---|---|
| 2,089,043 | Svensjo | Aug. 3, 1937 |
| 2,171,136 | Bergner | Aug. 29, 1939 |
| 2,230,210 | Brecour | Jan. 28, 1941 |

FOREIGN PATENTS

| | | |
|---|---|---|
| 516,611 | Great Britain | Jan. 5, 1940 |